United States Patent [19]

Knapen et al.

[11] Patent Number: 4,908,808
[45] Date of Patent: Mar. 13, 1990

[54] TIMEPIECE HAVING A MULTIPOLAR ROTOR

[75] Inventors: Petrus M. J. Knapen, Tilburg; Jonannes H. Wouterse, Eindhoven, both of Netherlands

[73] Assignee: Kinetron B.V., Tilburg, Netherlands

[21] Appl. No.: 210,225

[22] Filed: Jun. 23, 1988

[30] Foreign Application Priority Data

Jun. 26, 1987 [NL] Netherlands .................. 8701504

[51] Int. Cl.⁴ ............................................. G04F 1/04
[52] U.S. Cl. .................................. 368/157; 368/160; 310/164; 310/40 MM
[58] Field of Search ................. 368/80; 310/164

[56] References Cited

U.S. PATENT DOCUMENTS

| | | |
|---|---|---|
| 3,253,169 | 5/1966 | Haydon et al. |
| 3,256,453 | 6/1966 | Haydon. |
| 4,095,129 | 6/1978 | Tanai et al. |
| 4,426,159 | 1/1984 | Kosaka et al. .................. 368/80 |
| 4,506,181 | 3/1985 | Jones et al. .................. 310/156 |
| 4,547,758 | 10/1985 | Shimizu et al. .................. 310/156 |
| 4,584,495 | 4/1986 | Kordik. |
| 4,656,381 | 4/1987 | Komatsu .................. 310/164 |

FOREIGN PATENT DOCUMENTS

| | | |
|---|---|---|
| 856278 | 11/1952 | Fed. Rep. of Germany. |
| 2166739 | 10/1975 | Fed. Rep. of Germany. |
| 2950210 | 6/1981 | Fed. Rep. of Germany. |
| 444059 | 2/1968 | Switzerland .................. 368/80 |
| 1566622 | 5/1980 | United Kingdom. |
| 2062367 | 5/1981 | United Kingdom. |

Primary Examiner—Bernard Roskoski
Attorney, Agent, or Firm—Fay, Sharpe, Beall, Fagan, Minnich & McKee

[57] ABSTRACT

Electro-mechanical timepiece, comprising a circuit for generating electric pulses that appear at suitable points of time, a stepper motor controlled by said pulses and comprising a rotor (2) with permanently magnetic poles (8,9), a stator (3,4,5) and a coil (6), as well as a gear driven by the action of the step motor for driving the clock hands, the stator being constructed from two stator parts (3,4) situated on either side of the rotor and a yoke (5), connecting these two parts and extending through said coil. The poles (8,9) are situated in a same cross section plane, perpendicular to the rotation axis of the rotor, and form a ring-shaped layer (14) which is thin in radial direction. According to a preferred embodiment the rotor is at the radial inner side of the poles provided with an uninterrupted round-going ring-shaped portion (7) of soft-magnetic material.

14 Claims, 5 Drawing Sheets

TIMEPIECE HAVING A MULTIPOLAR ROTOR

The invention relates to an electro-mechanical timepiece, particularly a wrist watch, comprising an electronic circuit for generating a reference clock signal, a stepper motor controlled by said signal and comprising a rotor with permanent-magnetic poles, a stator and a coil, as well as a gear driven by the action of the stepper motor for driving the clock hands, the stator being constructed from two stator parts situated on either side of the rotor and a yoke, connecting these two parts and extending through said coil.

Such a watch is known from DE-A-No. 2,166,739. The watch described in said publication comprises a 6-pole rotor, driving all the clock hands by means of a gear wheel construction. Such a gear wheel construction requires space, and space is scarce in tiny objects such as watches.

For reasons of elegance or in order to create possibilities to build in extra functions, it would be advantageous if space could be saved on the parts in a timepiece such as a watch, e.g. by reducing the required space for the gear wheel construction.

therefore the invention aims to reduce the number of parts in the gear wheel construction in a timepiece of the above-mentioned type. According to the invention, this aim is attained in that the rotor comprises at least 12 poles, forming a thin layer in radial direction and being arranged alternatingly as North and South poles, arranged regularly over its circumference. Preferably the rotor comprises at least 60 poles, or in case of e.g. a decimal timepiece at least 100 poles.

Such a multipolar rotor creates the possibility of simplifying the gear wheel construction because one or more gear wheels can be left out. Direct driving of one of the clock hands is then possible, so that in an embodiment of the invention one of the hands has been connected to the rotor in such a way, that the rotational movement of the two is equal.

In this way the gear wheel construction or the clockwork can be restricted in its dimensions, and the thus available space can be used in some other way, either for reducing the size of the watch or for building in extra functions.

It is remarked that a 60-pole rotor with direct driving of second and minute hand is known from DE-A-No. 2,950,210, showing a 60-pole rotor with a stator that is coaxial therewith and comprises a flat coil in a yoke, having 60 claw poles. The pertaining drawings show that the diameter of the rotor is in the range of the diameter of the watch. In the timepiece according to the present invention, however, inherent to the provided type of stator/rotor/coil construction, the diameter of the rotor, in spite of its 12 or more poles, remains small with respect to the diameter of the timepiece, so that the required space for the rotor remains also relatively small.

As stated in the introduction, the stator is constructed of two parts situated on either side of the rotor and a yoke, connecting these parts and extending through said coil. The stator is of material of a high magnetic permeability. Depending on the direction of the electric current through the windings of the coil, which direction can be alternated as desired, the one stator part becomes a North pole and the other stator part a South pole or vice versa. Between the poles of the rotor and the stator bores, i.e. the inner edges of the stator parts turned towards the rotor, magnetic fields are created, causing the rotor to rotate, and thus, direct or indirect, the clock hands.

In order to create a magnetic induction of sufficient magnitude the rotor preferably comprises at the radial inner side of the poles an uninterrupted round-going portion of soft-magnetic material. This portion, which can be ring- or disc-shaped, provides a path for the magnetic flux from rotor-origin as well as from stator field-origin.

In order to avoid that, as a consequence of the presence of the larger number alternatingly arranged North and South poles on the circumference of the rotor, the rotor is as much attracted to the stator bores as rejected by them, the bore of each stator part, which bore is turned towards the rotor, comprises a number of teeth, the pitch of which being twice the pitch of the rotor poles and the tooth angle of which being at most equal to the pitch of the rotor poles. In order to also attain that the magnetic effect along the two stator bores is equivalent, the position of the teeth of the one stator bore is also shifted over one rotor pole pitch with respect to a position that is rotation-symmetric to the position of the teeth of the other stator bore.

Here, the pitch of the rotor poles or of the stator teeth, respectively, is the angle between subsequent lines that connect the rotation shaft with a same point of each rotor pole or each stator tooth, respectively. In a 60-pole rotor, the pitch is thus 6°, so that according to the invention the pitch for the stator teeth is 12°. The tooth angle is determined by the angle between the connecting lines of the tooth corners and the rotor axis, and is at most 6° according to the invention.

In order to have the rotor rotate in one direction, the teeth are provided with a bevel, extending in a direction opposite to the rotational direction of the rotor. Due to this asymmetric design of the teeth there is always a concentration of flux lines at the sharp tooth corner, by which, in the proportions of the arrangment according to the invention, by reversing the direction of the current in the coil, and thus reversing the poles of the stator parts having stator teeth, rotation of the rotor can be realized. The bevel preferably amounts to 10° to 30°. As a consequence of the concentration of the flux lines at the location of the sharp tooth corners, a holding torque is also obtained, for keeping the rotor, when not energized, in its place in the rest position.

Keeping the rotor, when not energized, in its rest position can also be achieved with the aid of at least one holding block of soft-magnetic material, situated coaxially to the rotor and at least substantially magnetically insulated from the stator parts, said block being situated in at least one open space between the stator parts around the rotor and comprising at least two, but at any rate an even number of teeth with a pitch that is equal to the pitch of the rotor poles and with a tooth angle that is at the most equal to half of their pitch. For the terms pitch and tooth angle reference is made to a preceding paragraph. The holding blocks concentrate and guide the flux lines of the magnetic fields of the rotor poles. The rotor poles will always tend towards a position, the rest position, in which these flux lines are as short as possible.

Each holding block may comprise a number of 2-toothed parts or be integral with 4 or more teeth in an even number. In order to increase the holding torque generated by the holding block or holding blocks, the number of teeth on the stator parts can be decreased to enlarge the open spaces between the stator parts, so that the number of holding blocks can be increased.

By positioning each holding block so, that the rest position of the rotor, as determined by the teeth of the holding block, deviates somewhat, but not more than half a rotor pole pitch in clockwise direction, from the rest position of the rotor as determined only by the stator poles, the current required for starting the rotational movement can be limited. For in this arrangement, the rotor is kept in a position clockwise slightly beyond the rest position determined by the stator teeth, so that when upon reenergizing the polarity of the stator teeth is reversed, the rotor is more easily set to motion. The bevel of the stator teeth can possibly be left out then.

The stator parts and at least one bridge piece, connecting the stator parts outside the coil and having a permeance as low as possible, can be formed as a whole. If one or more holding blocks are present, each holding block is preferably also part of that unity, by means of at least one bridge piece having a permeance as low as possible. With an arrangement like that it is considerably more simple to position the parts in question.

Keeping the permeance of a bridge piece as low as possible can be attained, if the bridge piece consists of the same soft-magnetic material as the stator parts, and if present, each holding block, by giving the bridge piece a very small thickness so that magnetic saturation will occur quickly. Another possibility is e.g. to incorporate the bridge piece in the whole, wherein the bridge piece consists of a different material, e.g. a synthetic material, than that of the stator parts and (if present) each holding block.

The invention will be further described hereafter on the basis of the embodiment example represented in the drawings.

Figure 1:
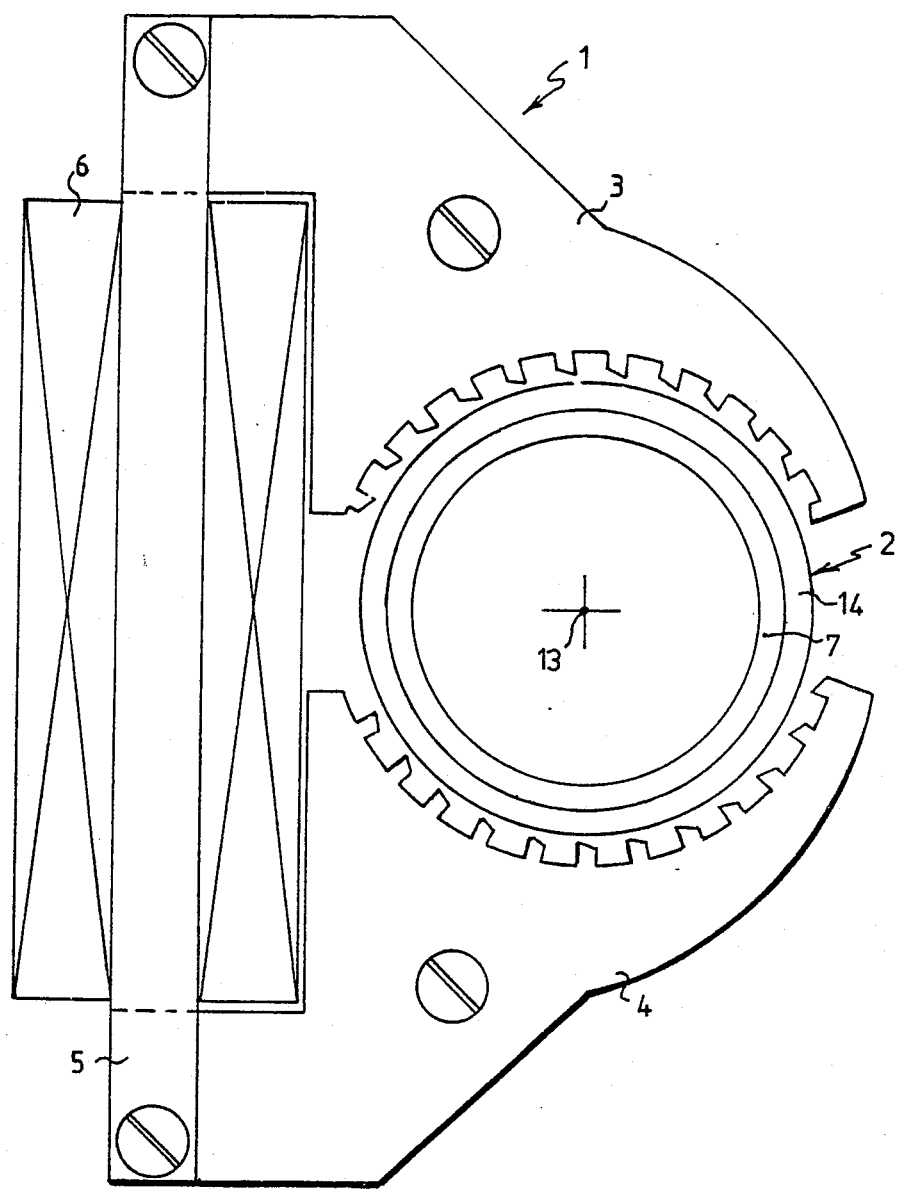
FIG. 1 represents the stepper motor according to a preferred embodiment of the invention.

The stepper motor represented in FIG. 1 is composed of a rotor 2 with a thin layer of permanent-magnetic material with at least 12, but in this example 60 poles, provided at its radial inner side with a ring 7 of soft-magnetic material, a coil 6 and a stator of soft-magnetic material, consisting of two stator parts 3, 4 situated on either side of the rotor and a yoke 5 connecting these stator parts 3, 4 and extending through the coil 6. The rotor 2 can be rotated about its shaft in a clockwise direction, as regarded in the figures.

At its circumference, the rotor comprises in this case 60 poles, arranged regularly and alternatingly as North and South poles. The rotor has a small diameter with respect to the usual diameter of a usual watch, e.g. about 4 mm.

When effecting a complete rotation (360°) of the rotor in 60 steps, it becomes advantageous to connect a second or minute hand of a clock to the rotor in such a manner, that such a hand simultaneously follows the rotational movement of the rotor. With such an arrangement, the gear wheel construction or clockwork usually required for the transfer of the rotational movement to the hands, can be simplified with a stepper motor having a relatively small rotor diameter as in the present invention.

Figure 2:
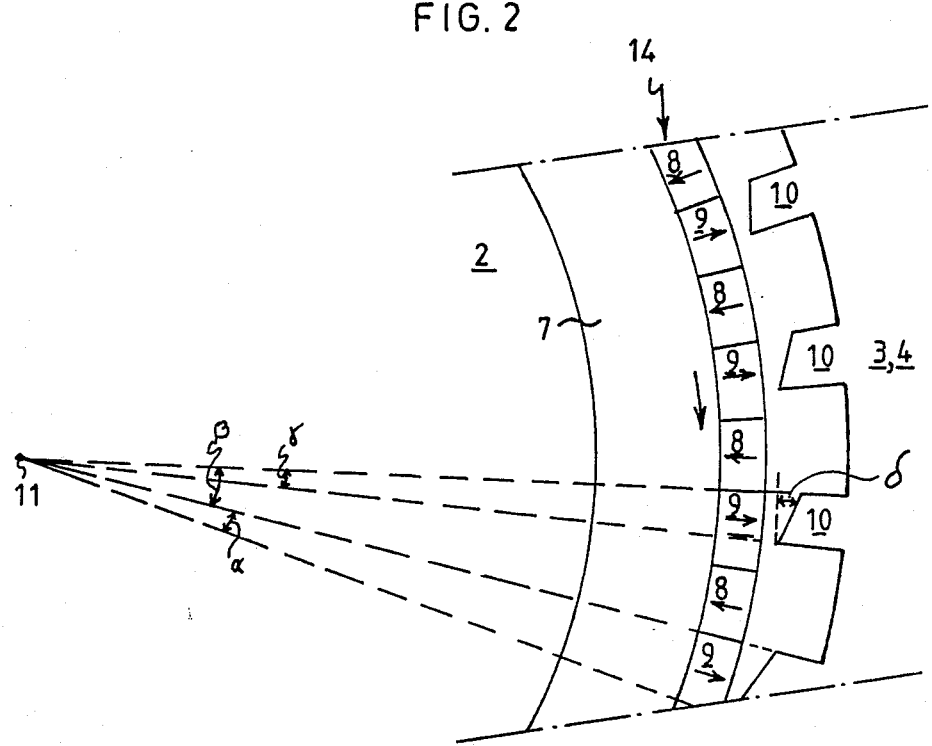
FIG. 2 represents a detail of the rotor circumference and the stator bore of the stepper motor shown in FIG. 1.

FIG. 2 represents the area where the stator bore and the rotor rim approach each other, at an enlarged scale. The rotor 2 comprises in its rim area a ring 7 of soft-magnetic material, and on the radial outer side thereof a layer of permanent-magnetized material 14 in the form of South poles 8 and North poles 9, said layer having a thickness in radial direction that corresponds to approximately half the pole width at the rotor circumference. The teeth of the bores of the stator parts 3 and 4 are indicated by 10. The pitch $\alpha$ of the rotor poles 8 and 9 amounts to $360/60=6°$, thus resulting in a pitch $\beta$ of the teeth 10 of $2\times6=12°$ and the tooth angle $\gamma$ of 6° or less, e.g. 4°.

The teeth of the one stator bore are always facing rotor poles that are opposite to the rotor poles that face the teeth of the other stator bore. This has been elucidated in FIG. 3 by indicating the tooth phases. It is remarked that the number of stator teeth can be larger of smaller as required. The locations of the teeth of stator part 4 are always shifted 6° (pitch $\alpha$ of the rotor poles) with respect to the locations on the stator part 4 that are rotation-symmetric to the locations of the teeth of the stator part 3.

Figure 3:
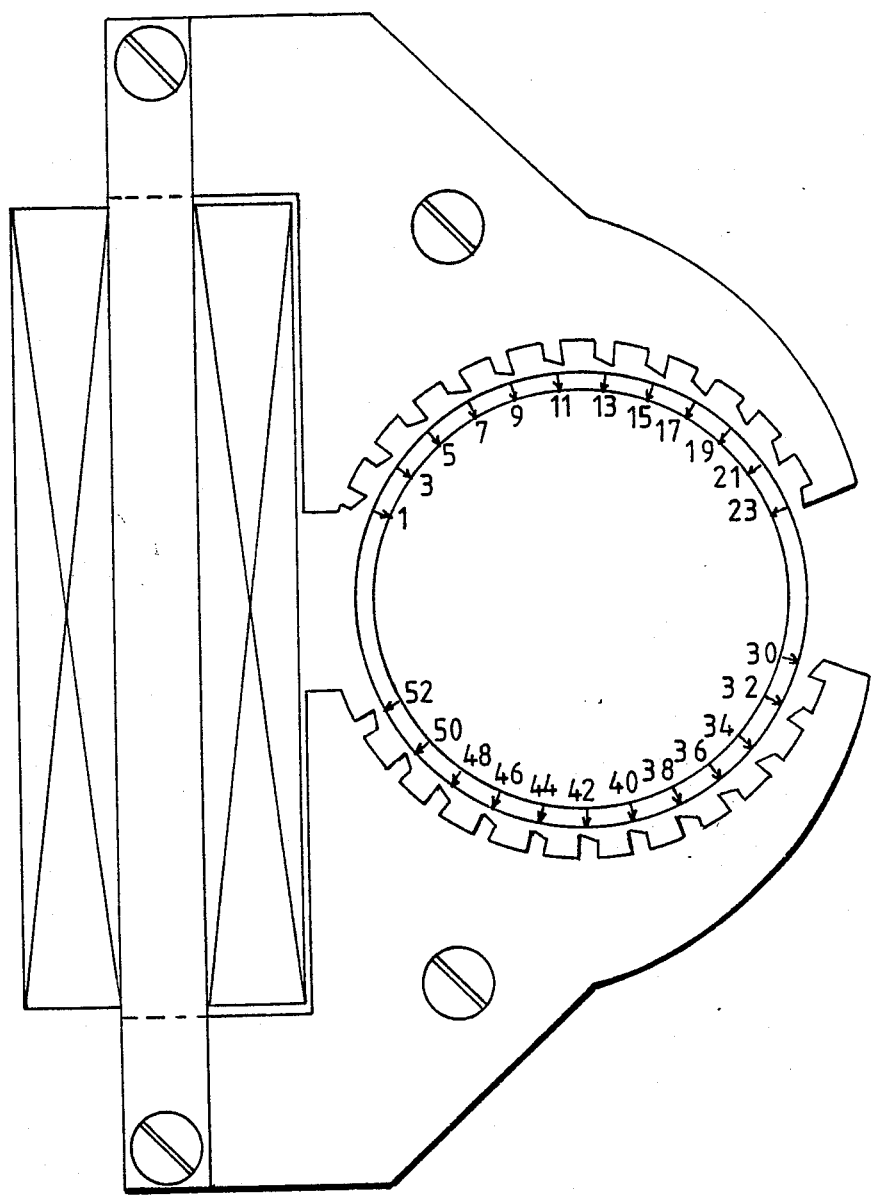
FIG. 3 represents the stepper motor of FIG. 1, indicating the tooth phase data.

In FIGS. 1, 2 and 3 it can furthermore be seen that the stator teeth 10 are provided with a bevel $\delta$ in a direction opposite to the rotational direction of the rotor 2. The bevel preferably amounts to 10° to 30°. The concentration of magnetic flux lines occurring at the thus created sharp corner has the consequence that, with the proportions of the arrangement according to the invention, upon reversing the direction of the current in the windings of the coil 6 and therefore upon changing polarity of the stator parts 3 and 4 and the teeth 10 forming part thereof, the facing rotor pole 8, 9 is rejected and the next rotor pole 9, 8, being of different polarity, is attracted, resulting in a clockwise rotor movement. Due to the concentration of magnetic flux lines at the location of the sharp tooth corner, the rotor, when incorporated in a watch, can also be maintained in its place for a predetermined period of time under dynamic circumstances of use.

Figure 4:
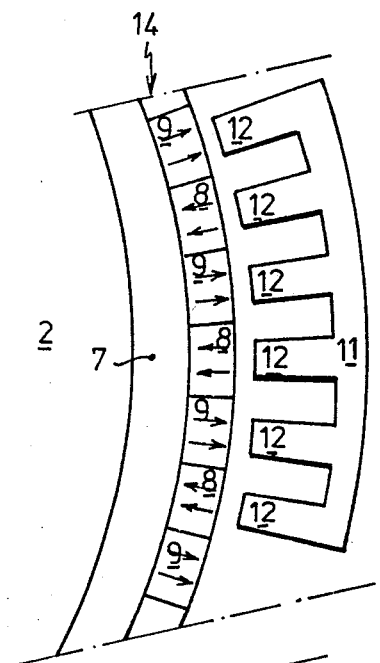
FIG. 4 represents a detail of an embodiment of a holding block according to the invention.
Figure 5:
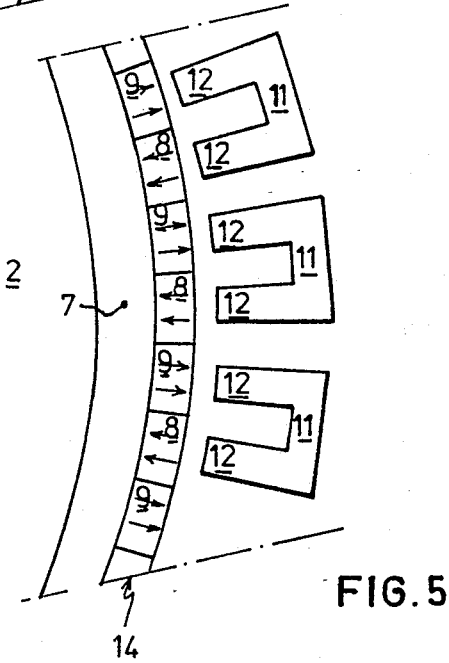
FIG. 5 represents a detail of another embodiment of a holding block according to the invention.
Figure 6:
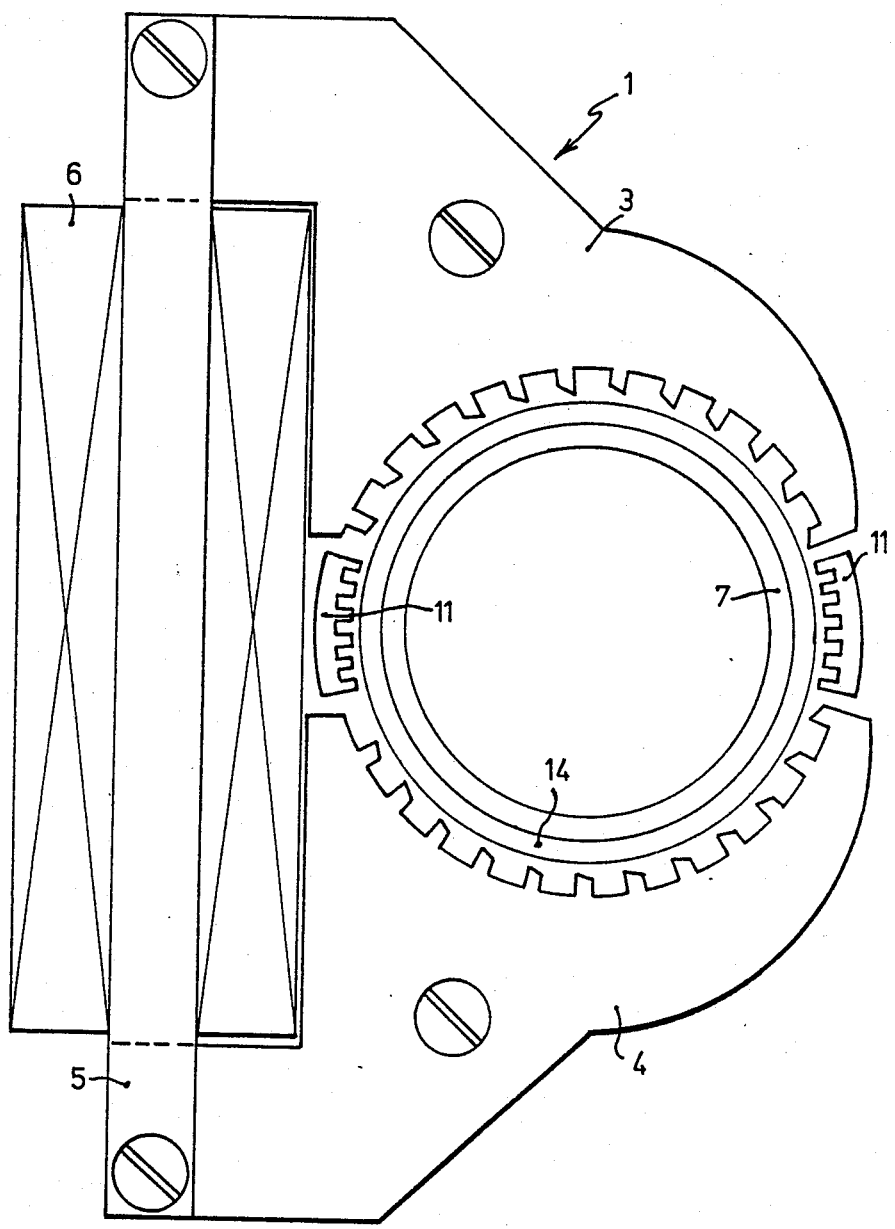
FIG. 6 represents a set of two holding blocks of FIG. 4, arranged in the stepper motor of FIG. 1.

In the embodiment of FIG. 4, the holding block 11 has six teeth 12. As an alternative, a plurality of smaller holding blocks 11 having an even number of teeth can be applied, e.g. as in figure 5. FIG. 6 shows that holding blocks 11 can applied on either side of the rotor if there is enough space available.

The holding block 11 is coaxially to the rotor 2. The teeth of the holding block (or of the holding blocks) 11 have a pitch $\epsilon$, that equals the pitch $\alpha$ of the rotor poles 8, 9 and a tooth angle $\zeta$, that is at most equal to half of their pitch $\epsilon$.

The holding block 11 can be used to generate a holding torque for keeping the rotor in its place when not energized. The holding block 11 can be situated so, that the rest position of the rotor 2 determined by this block coincides with the one determined by the stator parts 3, 4. If desired, the holding torque can be enlarged by shortening the rotor surrounding of the stator parts 3, 4 and by using the available space for enlarging the holding block 11. If the holding block 11 can generate sufficient holding torque, it can also be arranged displaced clockwise over an angle smaller than half the pitch α of the rotor poles 8, 9. In this position the rest position of the rotor 2 determined by the holding block is beyond the one which is solely determined by the stator parts 3, 4, having as a consequence that less power is required for starting the rotation of the rotor 2 at every step, in which case a lower current intensity in the coil is required. Since such an arrangement determines the rotational direction of the rotor, the bevels δ of the stator teeth 10 could be left out in this case.

We claim:

1. Electro-mechanical timepiece, comprising a circuit for generating electric pulses that appear at suitable points of time, a stepper motor controlled by said pulses and comprising a rotor with permanently magnetic poles, a stator and a coil, as well as a gear driven by the action of the stepper motor for driving the clock hands, the stator being constructed from two stator parts located in the same plane as and situated laterally on either side of the rotor, and a yoke, connecting these two parts and extending through said coil, wherein the poles are all situated in a single cross section plane, perpendicular to a rotational axis of the rotor, and form a ringshaped layer which is thin in a radial direction wherein at the radial inner side of the poles, the rotor includes an uninterrupted circular portion made of a soft-magnetic material, said material providing a path for a magnetic flux emanating from the rotor as well as a magnetic flux emanating from the stator.

2. Timepiece according to claim 1, wherein the portion is ring-shaped.

3. Timepiece according to claim 1, wherein the rotor comprises at least 60 poles.

4. Timepiece according to claim 4, wherein the rotor comprises at least 100 poles.

5. Timepiece according to one of the preceiding claims, wherein one of the hands is connected to the rotor in such a way that the rotational movement of the two is equal.

6. Timepiece according to claim 1, wherein the stator parts and at least one bridge piece, having a permeance that is as low as possible, and connecting the stator parts outside the coil, are integrally formed.

7. An electro-mechanical timepiece, comprising:
    a circuit for generating electric pulses;
    a stepper motor controlled by said pulses and comprising:
    a rotor comprising:
    a first ring-shaped portion of a softmagnetic material, and
    a second ring-shaped portion located radially outward of said first ring-shaped portion and comprising a plurality of magnetic poles,
    a stator comprising two sections located in the same plane as, and situated laterally on opposing sides of, said rotor, wherein said rotor first ring-shaped portion provides a path for a magnetic flux emanating from the rotor as well as a magnetic flux emanating from the stator,
    a yoke connecting said stator sections to each other, and
    a coil through which said yoke extends.

8. The timepiece of claim 7 wherein said stator sections each include on an inner periphery, facing said rotor, a plurality of teeth.

9. The timepiece of claim 8 wherein said teeth are beveled in a direction opposite a rotational direction of said rotor.

10. The timepiece of claim 9 wherein said bevel is approximately between 10° and 30°.

11. The timepiece of claim 7 wherein a diameter of said rotor is approximately 4 mm.

12. The timepiece of claim 7 further comprising a holding block which generates a holding torque for keeping the rotor from moving when said stepper motor is not energized.

13. The timepiece of claim 12 wherein said holding block comprises at least two teeth located on an inner periphery thereof facing said rotor.

14. The timepiece of claim 12 wherein said holding block is located in the same plane as said rotor and said stator parts.

* * * * *